United States Patent Office 3,245,999
Patented Apr. 12, 1966

3,245,999
5-NITROFURAN DERIVATIVES
Erich Haack, Heidelberg, Herbert Berger, Sulzberg, Allgau, and Wolfgang Vomel, Mannheim, Germany, assignors to C. F. Boehringer & Soehne G.m.b.H., Mannheim-Waldhof, Germany, a corporation of Germany
No Drawing. Filed Nov. 22, 1963, Ser. No. 325,760
Claims priority, application Germany, Dec. 19, 1962,
B 70,054
9 Claims. (Cl. 260—295)

This invention relates to certain new 5-nitrofuran derivatives and to method of compounding and using the same. More particularly, the invention relates to a new class of 5-nitrofuran derivatives having the formula:

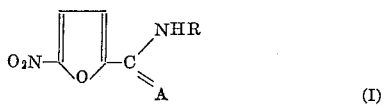

(I)

where R is hydrogen, alkyl, or acyl and A is an amino or hydrazino group. The products of the invention are of great therapeutic value, exhibiting excellent bacteriostatic activity, especially against *Staphylococcus aureus, Escherichia coli,* and *Mycobacterium tuberculosis*.

In accordance with the invention the new 5-nitrofuran derivative products can be prepared by the conventional methods and preferably are prepared by converting the corresponding amine or hydrazine with an imino ether or imidochloride having the following formula:

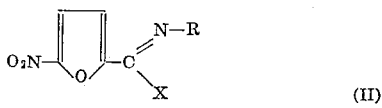

(II)

where R has the same significance as given above and X is chlorine or lower alkoxy.

Some example of radicals suitable as substituent A are aliphatic, aromatic, and heterocyclic amines, such as, for instance, aminopyridines, acylhydrazines, "acyl" designating in this connection a saturated or unsaturated aliphatic, aromatic, or heterocyclic carboxylic acid, or thiocarboxylic acid radical, as well as a carbonic acid semiester or semiamide radical, as for instance, a carboalkoxy, carbamoyl, or thiocarbamoyl radical.

The products of the invention, i.e., the amidines or amidrazones obtained by the process as above set out may exist in two tautomeric forms, e.g.

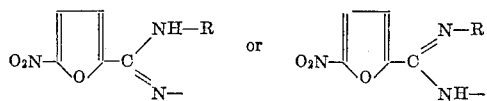

and

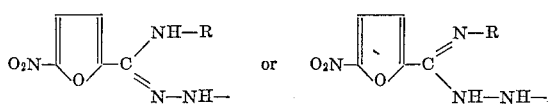

The invention will be more specifically illustrated by the following examples.

EXAMPLE 1

*1-(5-nitro-2-imidofuroyl)-thiosemicarbazide*

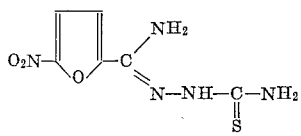

15.9 g. 5-nitro-2-furan-imidocarboxylic acid ethyl ester were dissolved in 87 ml. dimethylformamide and 7.9 g. of thiosemicarbazide were added to the resulting solution. The mixture obtained was then heated for 2 to 4 hours at 50° C. with stirring and thereafter vacuum concentrated down to about one half of its volume (bath temperature not above 50° C.). 260 ml. of water were added to the red suspension thus obtained, and the red crystalline product recovered from the suspension by suction filtering. The crystals were washed with water, treated with 170 ml. of water at 60° C., suction filtered and carefully vacuum dried. The resulting dry material was taken up in 170 ml. of ethylene chloride and then again with 80 ml. of ethylene chloride, suction filtered and recrystallized out of isopropanol. In this manner, 11 g. of 1-(5-nitro-2-imidofuroyl)-thiosemicarbazide having a melting point of 189° C. were obtained. The product was soluble in dilute hydrochloric acid and in dilute caustic soda solution turning a deep red color in the latter case.

$C_6H_7N_5O_3S$ (229):
  Calculated: C, 31.45%; H, 3.06%; N, 30.56%; S, 13.97%
  Found: C, 31.72%; H, 3.56%; N, 30.29%; S, 13.5%.
  Found molecular weight: 224 (titrated potentiometrically with $\frac{1}{10}$ N $HClO_4$ in glacial acetic acid).

EXAMPLE 2

*N-(5-nitro-2-imidofuroyl)-N'-isonicotinoyl-hydrazine*

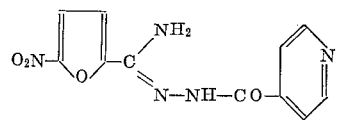

A solution of 0.92 g. 5-nitro-2-furan-imidocarboxylic acid ethyl ester in 4.5 ml. methanol was heated together with a solution of 0.69 g. isonicotinic acid hydrazide in 4.5 ml. of water for 2 hours at 50° C. The crystalline product which thereupon formed was separated by suction filtering and washed with a 1:1 solution of ethanol and water. There was obtained 1 gram of crude 5-nitro-2-(α-amino)-fural-isonicotinoylhydrazone.

The crude compound was purified by dissolving in 170 ml. of hot methanol, the small amount of undissolved matter being separated off. The resulting clear filtrate was vacuum evaporated down to about one half its original volume and the residue resulting crystallized. The yield amounted to 0.65 g. At 320° C. the crystals turned black and at 332° C. foaming occurs. The compound was soluble in dilute hydrochloric acid. In the presence of dilute caustic soda solution, the compound turned deep dark red color.

$C_{11}H_9N_5O_4$ (275):
  Calculated: C, 47.9%; H, 3.27%; N, 25.43
  Found: C, 47.9%; H, 3.25%; N, 25.39%.

EXAMPLE 3

*N-β-(5-nitro-2-imidofuroyl)-carbazinic acid ethyl ester*

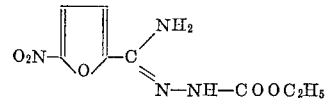

1.84 g. 5-nitro-2-furan-imidocarboxylic acid ethyl ester were dissolved in 9 ml. methanol and heated with a solution of 1.04 g. carbazinic acid ethyl ester (aminourethane) in 8 ml. of water for 2 hours at 50° C. The crystalline product which separated out was recovered by suction filtering and washed with a 1:1 solution of ethanol and water. In this manner, 2 grams of 5-nitro-2-(α-amino)-furfurylidene-carbazinic acid ethyl ester were obtained. The compound was recrystallized out of 40 ml. of dioxan and then out of 21 ml. ethanol. The yield of pure product amounted to 1 gram and had a melting point of 190–191° C.

$C_8H_{10}N_4O_5$ (242):
Calculated: C, 39.65%; H, 4.13%; N, 23.12%
Found: C, 39.17%; H, 4.23%; N, 23.05%.

The compound dissolved without coloration in dilute hydrochloric acid. On alkalinization of this solution with dilute caustic soda solution, a deep red coloration occurs.

EXAMPLE 4

N-α-pyridyl-(5-nitro-2-furamidine)

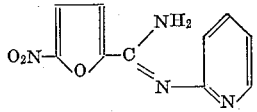

An intimate mixture of 1.85 g. 5-nitro-2-furan-imidocarboxylic acid ethyl ester and 0.94 g. α-aminopyridine was heated for 2 hours at 100° C. On cooling a solid material was formed which was treated with isopropylether. Any undissolved matter was separated out by suction filtering. The solid matter retained by the filter was dissolved in hot benzene and the further amount of undissolved material again separated. The clear benzene solution was concentrated using vacuum and the concentrate recrystallized out of 14 ml. isopropanol. In this manner, there were obtained 0.6 g. of C-(5-nitro-2-furyl)-N-(α-pyridyl)-formamidine having a melting point of 165–166° C.

$C_{10}H_8N_4O_3$ (232):
Calculated: C, 51.67%; H, 3.45%; N, 24.12%
Found: C, 51.97%; H, 3.7%; N, 23.76%.

EXAMPLE 5

N-methyl-N'-thioureido-(5-nitro-2-furamidine)

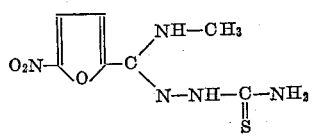

7.45 grams of a 33% aqueous solution of methylamine were introduced dropwise over a period of 30 minutes and with agitation into 4.8 g. 5-nitro-2-furoylchloride in 25 ml. ether. The ether was then decanted off from the material that had settled out, and the latter taken up with water. In this manner, 4 grams of 5-nitro-2-furancarboxylic acid-N-methylamide having a melting point of 206–209° C. were obtained.

3.8 g. of this amide were mixed with 7.1 g. phosphorus pentachloride and heated under weak vacuum for 1 hour at 100° C. The mixture was then completely concentrated by evaporation under vacuum. Benzene was added to the resulting concentrate and the concentration step repeated several times. The resulting concentrate was a crude, syrup comprising 5-nitro-2-furan-methyl-imido-carboxylic acid chloride. The yield of compound amounted to 4.55 g.

There was added to 4.2 g. of this crude imidochloride a solution of 2.2 g. thiosemicarbazide and 2.2 g. triethylamine in 22 ml. dimethylformamide, care being taken that the temperature did not rise above 50° C. The mixture obtained was then maintained for 2 hours at 50° C. and thereafter vacuum concentrated. The concentrate was treated with 1 N hydrochloric acid and suction filtered. The filtrate was neutralized using sodium bicarbonate (pH 7) and the separated product extracted with acetic acid ester. Following evaporation of the organic solvent, using vacuum, the resulting concentrate was treated with acetonitrile and recrystallized out of dioxan. In this manner, 0.3 grams of 5-nitro-2-(α-methylamino)-furfurylidene-thiosemicarbazone having a melting point of 256–258° C., (decomposition) were recovered.

The compound dissolved with formation of a deep red coloration in dilute caustic soda solution.

$C_7H_9N_5O_3S$ (243):
Calculated: C, 34.6%; S, 13.18%
Found: C, 35.3%; S, 13.1%.

EXAMPLE 6

N-acetyl-N'-carbethoxyamido-(5-nitro-2-furamidine)

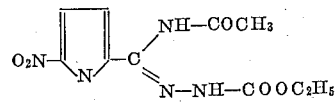

0.47 g. acetyl chloride were dissolved in a mixture of 2 ml. absolute ether and 0.6 ml. absolute dioxan, and 1.1 g. 5-nitro-2-furan-imidocarboxylic acid ethyl ester were added to the resulting solution. The solution, though clear at first, rapidly became turbid. It was then heated for 3 hours at 40° C., the hydrochloride of 5-nitro-2-furan-imidocarboxylic acid ethyl ester which separated was removed by suction filtration and washed back into the filtrate using ether. An oily residue was obtained by vacuum concentration of the filtrate. The yield of crude 5-nitro-2-furan-N-acetyliminocarboxylic acid ethyl ester amounted to 0.67 g. This iminoether was dissolved in 2 ml. absolute dioxan, 0.31 g. carbazinic acid ethyl ester (aminourethane) was added to the solution and the mixture heated for 3½ hours at 50° C. The precipitated crystals which formed were separated by suction filtering and washed with a little dioxan. In this manner 0.37 grams of 5-nitro-2-(α-acetamido)-furfurylidene-carbazinic acid ethyl ester having a melting point of 168–169° C. were obtained.

$C_{10}H_{12}N_4O_6$ (284):
Calculated: C, 42.2%; H, 4.22%; N, 19.69%
Found: C, 42.49%; H, 4.19%; N, 20.46%.

EXAMPLE 7

1-(5-nitro-2-imido-furoyl)-semicarbazide

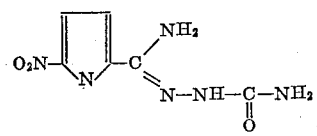

0.67 g. semicarbazide hydrochloride were dissolved in 5.5 ml. of water and the solution neutralized to a pH of 7 using aqueous soda solution therefor. Following the addition of 2 ml. ethanol, a solution of 1.1 g. 5-nitro-2-furan-imidocarboxylic acid ethyl ester in 6 ml. ethanol was added and the resulting mixture heated for 2 hours at 50° C. After cooling, the mixture was allowed to stand for a while at room temperature and the material precipitated out was recovered by suction filtering and washed with water. Additional amounts of the reaction product could be isolated from the mother liquor following a longer period of standing at room temperature. The combined crystalline products were dissolved in a little dilute hydrochloric acid. The small amounts of undissolved matter were removed and the clear solution quickly neutralized with sodium bicarbonate. The product which then precipitated was separated with suction filtering, washed with water and vacuum dried at 80° C. In this manner, 0.45 g. of 1-(5-nitro-2-imido-furoyl)-semicarbazide having a melting point of 221–222° C. (decomposition) were obtained.

$C_6H_7N_5O_4$ (213):
Calculated: N, 32.84%
Found: N, 32.37%.

The molecular weight determined by potentiometric titration with $HClO_4$ in glacial acetic acid was 218.

When dilute caustic soda solution was added to a sample of the compound, it turned a deep red color.

EXAMPLE 8

*N-(5-nitro-2-imidofuroyl)-N'-oxyacetyl-hydrazine*

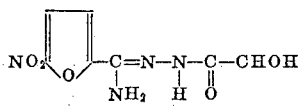

1.84 g. 5-nitro-furan-2-imidocarboxylic acid ethyl ester were dissolved in 9 ml. methanol and heated for 2 hours with a solution of 0.9 g. glycolic acid hydrazide in 9 ml. of water at 50° C. Following cooling of the solution a yellow crystalline product separated out. It was recovered by suction filtering and washed with alcohol-water (1:1). 1.6 grams of N-(5-nitro-2-imidofuroyl)-N'-oxyacetyl-hydrazine having a melting point of 181–182° C. were thereby obtained. The recovered compound dissolved in dilute caustic soda soltuion with a deep red coloration and in dilute hydrochloric acid without coloration.

The starting imidocarboxylic acid esters having the formula designated II above where X=alkoxy and which were used in the above Examples 1–4 and 6–8 as starting material represent new compounds. They are prepared by converting 5-nitrofuryl-(2)-cyanide in the presence of a halogen hydride with the corresponding alcohol. The hydrohalic acid salts of the new compounds which are first formed can be converted in the conventional manner to the free imino ethers. The preparation of the starting compound is illustrated by the following example.

$C_7H_8N_2O_4$ (184):
Calculated: C, 45.70%; H, 4.35%; N, 15.2%
Found: C, 45.99%; H, 4.51%; N, 15.0%.

The various compounds of the invention constitute excellent bacteriostatic agents for treatment of bacterial-induced disease or conditions.

The bacteriostatic efficacy of the novel 5-nitro-furan derivatives was established by the following experiments. The investigational procedures involve the conventional series dilution tests using in connection therewith a liquid nutrient medium. In order to obtain a broader basis for evaluation and in view of the manner in which the inhibiting values depend upon the strength of the bacterial innoculation, 3 to 5 different culture dilutions were used for each kind of organism. The nitrofuran compounds were used in the form of their aqueous solutions obtained by use of solubilizing organic solvents. In each series, representing a single experiment, any bacteriostatic activity on the part of the organic solvents was excluded by parallel control dilution series. These control solution series contain the same solvent concentrations as the actual experimental series but contain no nitrofuran compounds. The bacteriostatic minimum concentration given in the following table is the lowest concentration of the compounds evaluated which in each case completely suppresses the growth of bacteria.

The results of the investigation, as well as the actual compounds employed in the tests are set out in the following table.

*Table*

[Bacteriostatic activity—Minimum concentration in μg./ml.]

| Bacillus type—Bacillus class | A | B | C | D | E | F | G | Furacin [1] | Furaspor [2] |
|---|---|---|---|---|---|---|---|---|---|
| *Staphylococcus aureus* S G 511 | 8 | 32 | 8 | 64 | 8 | *4* | *2* | 8 | |
| *Escherichia coli* | *4* | 8 | 16 | 8 | 8 | *2* | 0.5 | 8 | |
| *Mycobacterium tuberculosis* H 37 Rv | >4 | *2* | *4* | *3* | *4* | >2 | *2* | 32 | |
| *Microsporum gypseum* | | >64 | >64 | >128 | *16* | 128 | | | 64 |
| *Trichophyton mentagrophytes* | | >128 | >64 | >128 | *32* | 128 | | | 128 |

[1] 5-Nitrofurfurol-semicarbazone.
[2] 5-Nitro-2-furfuryl-methylether.
The values which have been italicized designate the superiority of the new nitrofurane derivatives and in particular with respect to their activity against *Mycobacterium tuberculosis*.
(A) 1-(5-nitro-2-imido-furoyl)-thiosemicarbazide.
(B) 1-(5-nitro-2-imido-furoyl)-semicarbazide.
(C) N-(5-nitro-2-imido-furoyl)-N'-isonicotinoyl-hydrazine.
(D) N-β-(5-nitro-2-imidofuroyl)-carbazinic acid ethyl ester.
(E) N-α-pyridyl-(5-nitro-2-furamidine).
(F) N-acetyl-N'-carbethoxamido-(5-nitro-2-furamidine).
(G) N-methyl-N'-thioureido-(5-nitro-2-furamidine).

EXAMPLE 9

*5-nitro-2-furan-imidocarboxylic acid ethyl ester*

27.5 g. 5-nitro-2-furylcyanide were dissolved at room temperature in 10 ml. absolute ethanol and 200 ml. absolute ether. Thereafter at a temperature of 0° to 5° C. and with agitation, dry hydrogen chloride was passed through the mixture to saturation. The mixture was then maintained at this temperature for 24 hours. The hydrochloride of the iminoether which separated out was recovered by suction filtering, washed with absolute ether and dried in a desiccator over sodium hydroxide. The yield of iminoether hydrochloride amounted to 40.3 g. The compound had a melting point of 160–162° C. (decomposition).

44.1 g. of this hydrochloride were added in small increments and with strong agitation to a suspension of 25.2 g. sodium bicarbonate in 200 ml. of water under conditions whereby an acid pH value never takes place. Agitation is continued for 15 minutes. The product which is separated out is suction filtered, washed with water and dried over phosphorus pentoxide using vacuum at room temperature. In this manner, 39 g. of 5-nitro-2-furan-imidocarboxylic acid ethyl ester having a melting point of 60–68° C. were obtained. Following recrystallization from petroleum ether, the compound melted at 71–74° C.

One of the aspects of the invention is to provide compositions containing 5-nitrofuran derivatives in accordance with the invention for use in combatting bacterial-induced disease or conditions. According to the invention, the novel 5-nitrofuran derivatives may be associated with a carrier which may be either a solid material or a sterile parenteral liquid. The compositions may take the form of tablets, powders, capsules, or other dosage forms, which are particularly useful for oral ingestion. Liquid diluents are employed in sterile condition for parenteral use, that is, by injection. Such a medium may be a sterile solvent, such as water; the compositions may take the form of the active material, namely, the 5-nitrofuran derivative, admixed with solid diluents and/or tableting adjuvants, such as corn starch, lactose, talc, stearate talc, magnesium stearate, gums, or the like. Any of the tableting materials used in pharmaceutical practice may be employed where there is no incompatability with the 5-nitrofuran derivative constituting the active agent. The material may be tableted with or without adjuvants. Alternatively, the 5-nitrofuran derivative of the invention, with its adjuvant material may be placed in the usual capsule or resorbable material, such as the usual gelatin capsule and administered in that form. In yet another embodiment, the novel 5-nitrofuran derivative composition may be put up into powder packets and employed in that fashion. Or the 5-nitrofuran composition may be prepared in the form of a suspension material in which the 5-nitrofuran is not soluble.

The percentage of active ingredients in the compositions may be varied. It is necessary that the active ingredient constitute a portion such that a suitable dosage will be obtained. Obviously, several unit dosage forms may be administered at about the same time.

What is claimed is:
1. A 5-nitrofuran derivative having the formula:

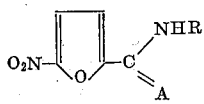

where R is a member selected from the group consisting of hydrogen, alkyl containing 1 to 3 carbon atoms and acyl containing 1 to 3 carbon atoms and A is a nitrogen bearing group of the formula N—R' wherein R' is selected from the group consisting of pyridyl, pyridine-carbonamido, ureido, thioureido, and lower carbalkoxyamido, the lower carbalkoxyamido groups containing not more then 3 carbon atoms.

2. 1-(5-nitro-2-imidofuroyl)-thiosemicarbazide.
3. N-(5-nitro-2-imidofuroyl)-N'-isonicotinoyl-hydrazine.
4. N-β-(5-nitro-2-imidofuroyl)-carbazinic acid ethyl ester.
5. N-α-pyridyl-(5-nitro-2-furamidine).
6. N-methyl-N'-thioureido-(5-nitro-2-furamidine).
7. N-acetyl-N'-carbethoxyamido-(5-nitro-2-furamidine).
8. 1-(5-nitro-2-imidofuroyl)-semicarbazide.
9. N-(5-nitro-2-imidofuroyl)-N'-oxyacetyl-hydrazine.

References Cited by the Examiner

UNITED STATES PATENTS

| 2,596,069 | 5/1952 | Fox | 167—65 |
| 2,677,641 | 5/1954 | Williams et al. | 167—65 |
| 2,945,047 | 7/1960 | Sherman | 260—347.2 |
| 2,946,801 | 7/1960 | Fields | 260—295 |
| 2,971,003 | 2/1961 | Parker et al. | 260—295 |
| 3,159,654 | 12/1964 | Ward | 260—347.4 |

OTHER REFERENCES

Taylor et al., Sidgwick's Organic Chemistry of Nitrogen (Oxford 1942), pp. 154—155.

WALTER A. MODANCE, *Primary Examiner.*

JOHN D. RANDOLPH, *Examiner.*

ALAN L. ROTMAN, *Assistant Examiner.*

UNITED STATES PATENT OFFICE
CERTIFICATE OF CORRECTION

Patent No. 3,245,999                                April 12, 1966

Erich Haack et al.

It is hereby certified that error appears in the above numbered patent requiring correction and that the said Letters Patent should read as corrected below.

Column 4, lines 10 to 13, the formula should appear as shown below instead of as in the patent:

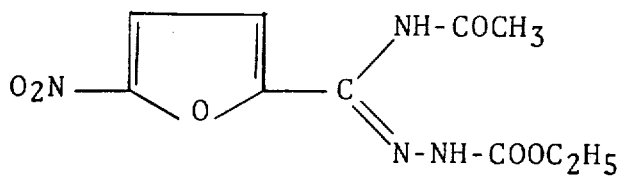

lines 42 to 46, the formula should appear as shown below instead of as in the patent:

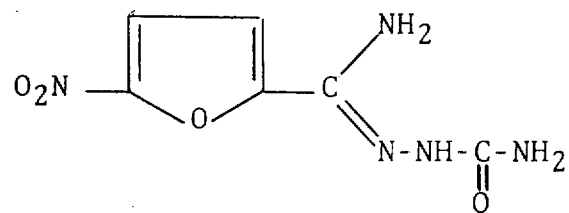

Signed and sealed this 1st day of August 1967.

(SEAL)
Attest:

EDWARD M. FLETCHER, JR.                          EDWARD J. BRENNER
Attesting Officer                                   Commissioner of Patents